(12) United States Patent
Weaver

(10) Patent No.: US 8,054,790 B2
(45) Date of Patent: Nov. 8, 2011

(54) FREQUENCY MAPPING FOR A WIRELESS COMMUNICATION SYSTEM

(75) Inventor: Carl Francis Weaver, Morris Plains, NJ (US)

(73) Assignee: Alcatel Lucent, Paris (FR)

( * ) Notice: Subject to any disclaimer, the term of this patent is extended or adjusted under 35 U.S.C. 154(b) by 807 days.

(21) Appl. No.: 12/149,602

(22) Filed: May 5, 2008

(65) Prior Publication Data

US 2009/0275339 A1  Nov. 5, 2009

(51) Int. Cl.
*H04W 4/00* (2009.01)
(52) U.S. Cl. .......................... 370/329; 455/447
(58) Field of Classification Search .................. 370/328, 370/329, 337, 343, 344; 455/447
See application file for complete search history.

(56) References Cited

U.S. PATENT DOCUMENTS

| | | | |
|---|---|---|---|
| 5,649,292 A * | 7/1997 | Doner | 455/447 |
| 7,251,492 B2 | 7/2007 | Zhang | |
| 2001/0046866 A1* | 11/2001 | Wang | 455/447 |
| 2003/0002458 A1 | 1/2003 | Bernheim | |
| 2003/0119517 A1* | 6/2003 | Dhainaut | 455/447 |
| 2004/0203804 A1* | 10/2004 | Merwe | 455/446 |
| 2005/0202784 A1* | 9/2005 | Xu et al. | 455/63.3 |
| 2006/0109865 A1* | 5/2006 | Park et al. | 370/482 |
| 2006/0205422 A1* | 9/2006 | Hyslop et al. | 455/509 |
| 2006/0212133 A1* | 9/2006 | Damnjanovic et al. | 700/1 |
| 2006/0258362 A1* | 11/2006 | Jin et al. | 455/450 |
| 2010/0103906 A1* | 4/2010 | Montojo et al. | 370/335 |

FOREIGN PATENT DOCUMENTS

| | | |
|---|---|---|
| EP | 1 276 340 | 1/2003 |
| EP | 1 662 825 | 5/2006 |
| EP | 1 662 826 | 5/2006 |

OTHER PUBLICATIONS

International Preliminary Search Report dated Aug. 9, 2010.
International Search Report and Written Opinion dated Aug. 27, 2009.

\* cited by examiner

*Primary Examiner* — Brian Nguyen
(74) *Attorney, Agent, or Firm* — Harness, Dickey, Pierce

(57) ABSTRACT

Example embodiments are directed to frequency mapping for a wireless communication system. An example embodiment provides a method frequency reuse method. The frequency reuse method includes assigning frequencies for use and reuse to sectors of a cell of a wireless communication system; and communicating with a mobile station using the assigned frequency. Each of the sectors includes sub-sectors, and each of the sub-sectors have an assigned frequency for communicating with a mobile station within the sub-sector. The frequency assignments for each sector of the cell are different.

16 Claims, 3 Drawing Sheets

Comparison of new ("FBa") and existing ("FBb") methods in CINR distribution

FREQUENCY MAPPING FOR A WIRELESS COMMUNICATION SYSTEM

BACKGROUND

1. Field of the Invention

Example embodiments of the present application relate to frequency mapping for a wireless communication system.

2. Background Information

Wireless communication systems enable people to communicate with one another over distances without having to necessarily access landline-connected devices such as conventional telephones. Early wireless communication systems were primarily configured for voice communications. However, technological improvements have enabled the development of third generation (3G) and similar wireless networks for both voice and high-speed packet data transfer such as WiMAX. WiMAX is a telecommunications technology aimed at providing wireless data communication over relatively long distances and is based on the IEEE 802.16e standard.

A base station of a conventional WiMAX communication system provides services to mobile stations within a coverage area referred to as a cell. As used herein, the term cell refers to an entire coverage area of a single base station. A base station providing communication services to a cell includes a plurality of antennas. Each of the antennas provides communication services to a smaller coverage within a cell. As such, each coverage area of a base station may be divided into smaller areas referred to as sectors. In addition, the sectors may be further divided into sub-sectors. As such, one or more antennas of a base station may be configured to provide communication services to only a single sector or sub-sector.

In the previous paragraph and throughout this disclosure, a cell is defined as the aggregate of all collocated sectors at one cellular base station location, which is not consistent with the usage of some organizations in the WiMAX community. It is also noted that in some cases, a base station might be defined as one sector and one carrier only in some organizations in the WiMAX community, whereas in this disclosure, base station is defined as the collection of all sectors and carriers at one cellular base station location.

A base station may include antennas configured consistent with a well-known Reuse 1 frequency pattern or a well-known Reuse 3 frequency pattern. In the Reuse 1 frequency pattern, one frequency is used to communicate with the entire cell. In the Reuse 3 frequency pattern a different frequency is used for each of the three sectors of a cell. However, it is noted that in these well-known patterns different frequencies are not used for different sub-sectors within a sector of a cell. Also, typically, sub-sectors are not used, or if sub-sectors are used, the sub-sectors are not using different frequencies.

SUMMARY

Example embodiments of the present application are directed towards frequency mapping for a wireless communication system including cells, sectors and sub-sectors.

Example embodiments are directed towards frequency mapping of a wireless communication system including cells and sectors in which no directly adjacent sectors use the same frequency to communicate to mobile stations.

Example embodiments are directed towards a frequency mapping that reduces, minimizes and/or prevents interference resulting from a first base station communicating with a first mobile station within a sector or sub-sector and a second base station communicating with a second mobile station within a directly adjacent sector or sub-sector.

An example embodiment of the present application is directed towards a frequency reuse method for wireless communications. The frequency reuse method includes assigning a plurality of frequencies for use and reuse to a plurality of sectors of a cell of a wireless communication system; and communicating with a mobile station using the assigned frequency. Each of the plurality of sectors includes a plurality of sub-sectors, and each of the plurality of sub-sectors have an assigned frequency for communicating with a mobile station within the sub-sector. The frequency assignments for each sector of the cell are different.

According to an example embodiment, a first frequency assigned to a first sub-sector within a first sector of the cell is different from a second frequency assigned to a first sub-sector of a second sector of the cell. A location of the first sub-sector within the first sector corresponds to a location of the first sub-sector within the second sector.

According to an example embodiment, each sector includes three sub-sectors, and the cell includes three sectors.

According to an example embodiment, first through third sub-sectors of the first through third sectors of the cell are assigned first through third frequencies as follows: (A, a, 1); (A,b,2); (A,c,3); (B,a,2); (B,b,3); (B,c,1); (C,a,3); (C,b,1); (C,c,2), wherein A represents the first sector, B represents the second sector, C represents the third sector, a represents the first sub-sector, b represents the second sub-sector, c represents the third sub-sector, 1 represents the first frequency, 2 represents the second frequency, and 3 represents the third frequency.

Another example embodiment provides a frequency reuse method for a wireless communication system including a plurality of cells. The frequency reuse method includes assigning a plurality of frequencies to each cell of a wireless communication system; and communicating with a mobile station using the assigned frequency. Each cell includes a plurality of sectors and each of the plurality of sectors includes a plurality of sub-sectors. Each of the plurality of sub-sectors are assigned a frequency for communicating with the mobile station within the sub-sector. The assigned frequency of a first sub-sector of a first cell is different from the assigned frequency of an adjacent sub-sector of another cell adjacent to the first cell.

According to an example embodiment, the assigned frequency of the first sub-sector is different from the assigned frequency of all sub-sectors adjacent to the first sub-sector.

According to an example embodiment, the plurality of frequencies assigned to each cell are the same.

According to an example embodiment, the frequency assignments for each sector of a same cell are different.

According to an example embodiment, a first frequency assigned to a first sub-sector within a first sector of the first cell is different from a second frequency assigned to a first sub-sector of a second sector of the first cell. A location of the first sub-sector within the first sector corresponds to a location of the first sub-sector within the second sector.

According to an example embodiment, each sector includes three sub-sectors and each cell includes three sectors.

According to an example embodiment, first through third sub-sectors of the first through third sectors of each cell are assigned first through third frequencies as follows: (A, a, 1); (A,b,2); (A,c,3); (B,a,2); (B,b,3); (B,c,1); (C,a,3); (C,b,1); (C,c,2), wherein A represents the first sector, B represents the second sector, C represents the third sector, a represents the first sub-sector, b represents the second sub-sector, c represents the third sub-sector, 1 represents the first frequency, 2 represents the second frequency, and 3 represents the third frequency.

Still another example embodiment provides a frequency reuse method for wireless communications. The frequency reuse method includes assigning a plurality of frequencies for use and reuse to a plurality of sectors of a plurality of cells of a wireless communication system; and communicating with the mobile station using the assigned frequency of a corresponding sector. Each of the plurality of sectors of each cell are assigned a frequency for communicating with the mobile station within a corresponding sector. The frequency assignments for each cell are the same and no sector is assigned a same frequency as a directly adjacent sector.

According to an example embodiment, each cell includes nine sectors.

According to an example embodiment, the first through ninth sectors arranged in a clockwise direction around a base station of each cell are assigned first through third frequencies in accordance with the pattern 1, 2, 3, 2, 3, 1, 3, 1, 2, wherein 1 represents a first frequency, 2 represents a second frequency, and 3 represents a third frequency. The first frequency, second frequency and third frequencies are all different from each other.

BRIEF DESCRIPTION OF THE DRAWINGS

The above and other features and advantages of example embodiments will become more apparent by reviewing the following detailed description of example embodiments of this disclosure with reference to the attached drawings in which.

DETAILED DESCRIPTION OF EXAMPLE EMBODIMENTS

In the following description, for purposes of explanation and not limitation, specific details are set forth such as particular architectures, interfaces, techniques, etc., in order to provide a thorough understanding of example embodiments. However, it will be apparent to those skilled in the art that example embodiments may be practiced in other illustrative embodiments that depart from these specific details. In some instances, detailed descriptions of well-known devices, circuits, and methods are omitted so as not to obscure the description of example embodiments with unnecessary detail. All principles, aspects, and embodiments, as well as specific examples thereof, are intended to encompass both structural and functional equivalents thereof. Additionally, it is intended that such equivalents include both currently known equivalents as well as equivalents developed in the future.

Example embodiments are discussed herein as being implemented in a suitable computing environment. Example embodiments may be considered as described below in the general context of computer-executable instructions, such as program modules or functional processes, being executed by one or more processors or CPUs. Generally, program modules or functional processes include routines, programs, objects, components, data structures, etc. that perform particular tasks or implement particular abstract data types. The program modules and functional processes discussed herein may be implemented using existing hardware in existing communication networks such as a WiMAX wireless communication system or network. For example, program modules and functional processes discussed herein may be implemented using existing hardware at existing radio network control nodes, base stations, etc.

It will be understood that acts, operations and functional processes described herein are performed by processors included in radio network control nodes, base stations, etc. These acts, operations and functional processes transform the data or maintain data at locations in the memory systems of radio network control nodes, base stations, etc., which reconfigures or otherwise alters the operation of radio network control nodes, base stations, etc., in a manner well understood by those skilled in the art.

Example embodiments of the present application relate to frequency mapping for a wireless communication system including cells, sectors and sub-sectors.

Figure 1:
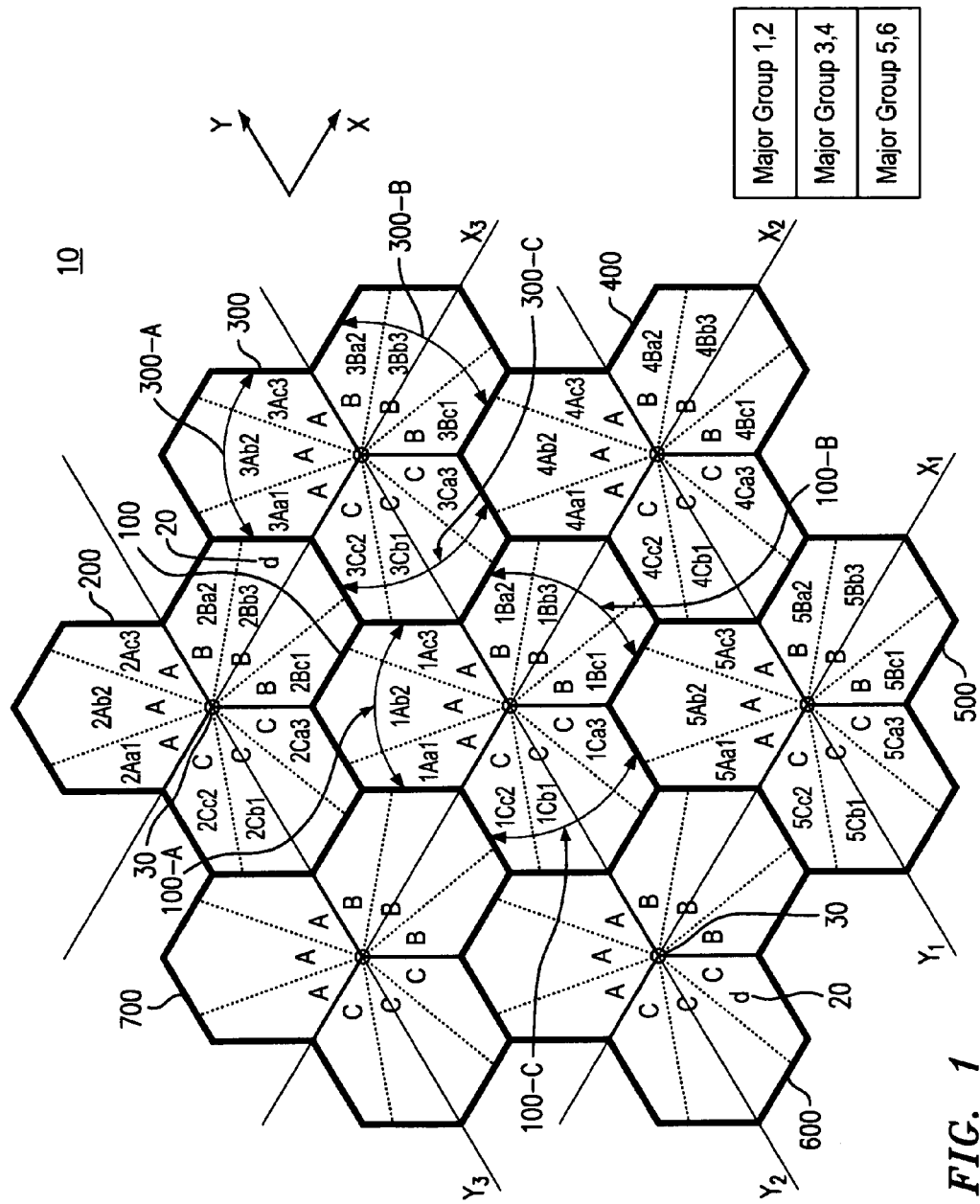
FIG. 1 illustrates an example embodiment of a cell layout and related frequency mapping.

FIG. 1 illustrates an example cell layout of a wireless communication system 10 having a frequency mapping according to an example embodiment of the present application. The cell layout of FIG. 1 includes a plurality of cells. In particular, the cell layout of FIG. 1 includes seven cells identified as 100, 200, 300, 400, 500, 600 and 700, respectively. It is noted that all of the cells have the same components and/or characteristics unless specifically identified in the example embodiments described below. The cells in FIG. 1 are identified by different numbers simply to aid the explanation of example embodiments of the application when referring to adjacent cells, for example.

Each of the cells represents a coverage area supported by a base station 30 of the corresponding cell. Each base station 30 provides wireless communication services including voice and/or data services to mobile stations 20 located in a corresponding cell. One skilled in the art will appreciate the base stations 30 and mobile stations 20 include a variety of components including a processor, memory, transceiver, etc.

Referring to the example cell layout of FIG. 1, the seven cells 100, 200, 300, 400, 500, 600, and 700 are arrayed in a first direction referred to herein as an X-direction, and a second direction referred to herein as a Y-direction. In particular, the axes identified as X1, X2 and X3 are used to identify cells adjacent to each other in the X-direction. The axes X1, X2 and X3 are shown as passing through the base stations 30 of the cells along the respective X-axes. The axes identified as Y1, Y2 and Y3 are used to identify cells adjacent to each other in the Y-direction and are shown as passing through base stations 30 of the cells along the respective Y-axes.

According to an example embodiment each of the cells is divided into sectors, and each of the sectors is divided into sub-sectors. Frequencies are assigned to each sub-sector for transmission of traffic channels, control channels, etc. The assignment of frequencies is sometimes referred to herein as the frequency mapping of the cell layout.

The identifier for each sub-sector provides information regarding each sub-sector shown in FIG. 1. In particular, each of the sub-sectors are identified according to the following: (WXYZ), wherein W identifies of one of the seven cells, X identifies a sector of a cell, Y identifies a location of a sub-sector within a sector, and Z identifies an assigned frequency used by a base station 30 to communication with mobile stations 20 included within a cell.

For example, a cell 100 shown in FIG. 1 includes three sectors identified as 100-A, 100-B and 100-C. A first sector 100-A is divided into three sub-sectors identified as 1Aa1, 1Ab2, and 1Ac3; a second sector 100-B is divided into three sub-sectors 1Ba2, 1Bb3 and 1Bc1; and a third sector 100-C is divided into three sub-sectors 1Ca3, 1Cb1 and 1Cc2. Similarly, a cell 300 directly adjacent to cell 100 along the X2 axis includes three sectors 300-A, 300-B and 300-C. A first sector 300-A is divided into three sub-sectors 3Aa1, 3Ab2 and 3Ac3; a second sector 300-B is divided into three sub-sectors 3Ba2, 3Bb3, 3Bc1; and a third sector 300-C is divided into three sub-sectors 3Ca3, 3Cb1 and 3Cc2.

As previously mentioned, frequencies, which are represented by the last character in the sub-sector identifiers, are assigned to each sub-sector for transmission of traffic channels, control channels, etc. For example, a base station 30 includes one or more antennas configured to communication with mobile stations 20 within a corresponding sub-sector. The antennas are configured to transmit and receive a fixed antenna beam at a specified frequency, frequency band or frequency sub-band. One skilled in the art will appreciate that a frequency assignment of a cell, sector, or sub-sector referred to below refers to the frequency, frequency band or frequency sub-band used by one or more antennas of a base-station to communication with different mobile stations located within a cell, sector, or sub-sector.

The frequency assignments for each of the cells are the same in the example embodiment shown in FIG. 1. For example, each cell shown in FIG. 1 uses and reuses three different frequencies for the nine sub-sectors of each cell. These three different frequencies are represented by the last number of the sub-sector identifier.

Referring to FIG. 1, the frequency assignments of the sub-sectors 1Aa1, 1Ab2, 1Ac3, 1Ba2, 1Bb3, 1Bc1, 1Ca3, 1Cb1, 1Cc2 of cell 100 are represented by the following pattern: 1, 2, 3, 2, 3, 1, 3, 1, 2. Frequency assignments of the sub-sectors 2Aa1, 2Ab2, 2Ac3, 2Ba2, 2Bb3, 2Bc1, 2Ca3, 2Cb1, 2Cc2 of cell 200 are represented by the same pattern 1, 2, 3, 2, 3, 1, 3, 1, 2. As such, the frequency mapping of each cell is the same according to example embodiments of the present application.

While the frequency mapping of each cell shown in FIG. 1 is the same, each sector of a cell has a different frequency mapping according to example embodiments of the present application. For example, the cell 100 includes the first sector 100-A, the second sector 100-B and the third sector 100-C and each of these sectors have a different frequency mapping. Stated differently, the relationship between the assigned frequency of a sub-sector and location of the sub-sector within each sector of a cell is different. The frequencies assigned to the first sub-sector 1Aa1, the second sub-sector 1Ab2 and the third sub-sector 1Ac3 of the first sector 100-A shown in FIG. 1 indicates the first sector 100-A has a frequency mapping represented by 1, 2, 3. However, the frequencies assigned to the first sub-sector 1Ba2, the second sub-sector 1Bb3 and the third sub-sector 1Bc1 of the second sector 100-B shown in FIG. 1 indicates the second sector 100-B has a frequency mapping represented by 2, 3, 1. Further, the frequencies assigned to the first sub-sector 1Ca3, the second sub-sector 1Cb1 and the third sub-sector 1Cc2 of the third sector 100-C shown in FIG. 1 indicates the third sector 100-C has a frequency mapping represented by 3, 1, 2.

Still further, according to example embodiments an assigned frequency for communicating with mobile stations within the sub-sector is different from the assigned frequency associated with any directly adjacent sub-sector. For example, the first sub-sector 1Ba2 of sector 100-B of cell 100 has five directly adjacent sub-sectors as shown in FIG. 1. The five directly adjacent sub-sectors are 1Ac3, 1Bb3, 4Aa1, 3Ca3 and 3Cb1. The assigned frequency associated with the first sub-sector 1Ba2 is the frequency represented by 2, whereas as all of the sub-sectors directly adjacent to the first sub-sector 1Ba2 are assigned frequencies represent by the identifier 1 or 3.

The inventor has recognized that cell designs having a cell layout such as described above with respect to FIG. 1 result in a sub-sector being assigned a frequency different from all directly adjacent sub-sectors. Accordingly, the above-described frequency mapping reduces, minimizes and/or prevents interference resulting from a first base station communicating with a first mobile station within a sub-sector and a second base station communicating with a second mobile station within a directly adjacent sub-sector.

Based on an appreciation of the above recognized aspects of the cell layout, the inventor determined that the carrier-to-interference-noise CINR could be significantly improved by assigning frequencies to the sub-sectors according to the above-described example embodiment. According to an example embodiment, all the boundaries between frequencies of sub-sectors are mismatched.

While the example embodiment shown in FIG. 1 includes cells having three sectors further divided into three sub-sectors and a base station of each cell uses and reuses three frequencies for the nine sub-sectors of each cell, one skilled in the art will appreciate that the number of sectors, sub-sectors and assigned frequencies may be varied without departing from the teachings of the present application.

According to another example embodiment, instead of each cell being divided into three sectors and each sector being further divided into three sub-sectors, the cell is divided into nine sectors. The nine sectors are not further divided into sub-sectors. In this example embodiment, the assigned frequencies of the nine sectors of the cell would have a frequency mapping of 1, 2, 3, 2, 3, 1, 3, 1, 2. As such, the frequency mapping of the nine sectors of the cell in this example embodiment would match the frequency mapping of the sub-sectors of the cell described above with respect to FIG. 1. Stated differently, the assigned frequencies of a cell including nine sectors according to the example embodiment is represented by the pattern 1, 2, 3, 2, 3, 1, 3, 1, 2. Each number in this pattern represents a frequency assigned to one of the nine sectors of a cell. In particular, the first number in the pattern represents a frequency assigned to a first sector; the second number in the pattern represents a frequency assigned to a second sector directly adjacent to the first sector in a clockwise direction around a base station location; the third number in the pattern represents a frequency assigned to a third sector directly adjacent to the second sector in the clockwise direction; the fourth number in the pattern represents that a fourth sector directly adjacent to the third sector in the clockwise direction around the base station location; etc. Accordingly, the frequency assigned to the fourth sector is the same frequency assigned to the second sector located between the first sector and third sector.

Other Considerations

As previously mentioned in the example embodiment shown in FIG. 1, the frequency assignments of the sub-sectors 1Aa1, 1Ab2, 1Ac3, 1Ba2, 1Bb3, 1Bc1, 1Ca3, 1Cb1, 1Cc2 of cell 100 are represented by the following pattern 1, 2, 3, 2, 3, 1, 3, 1, 2. Frequency assignments of the sub-sectors 2Aa1, 2Ab2, 2Ac3, 2Ba2, 2Bb3, 2Bc1, 2Ca3, 2Cb1, 2Cc2 of cell 200 are represented by the same pattern 1, 2, 3, 2, 3, 1, 3, 1, 2.

Figure 2:
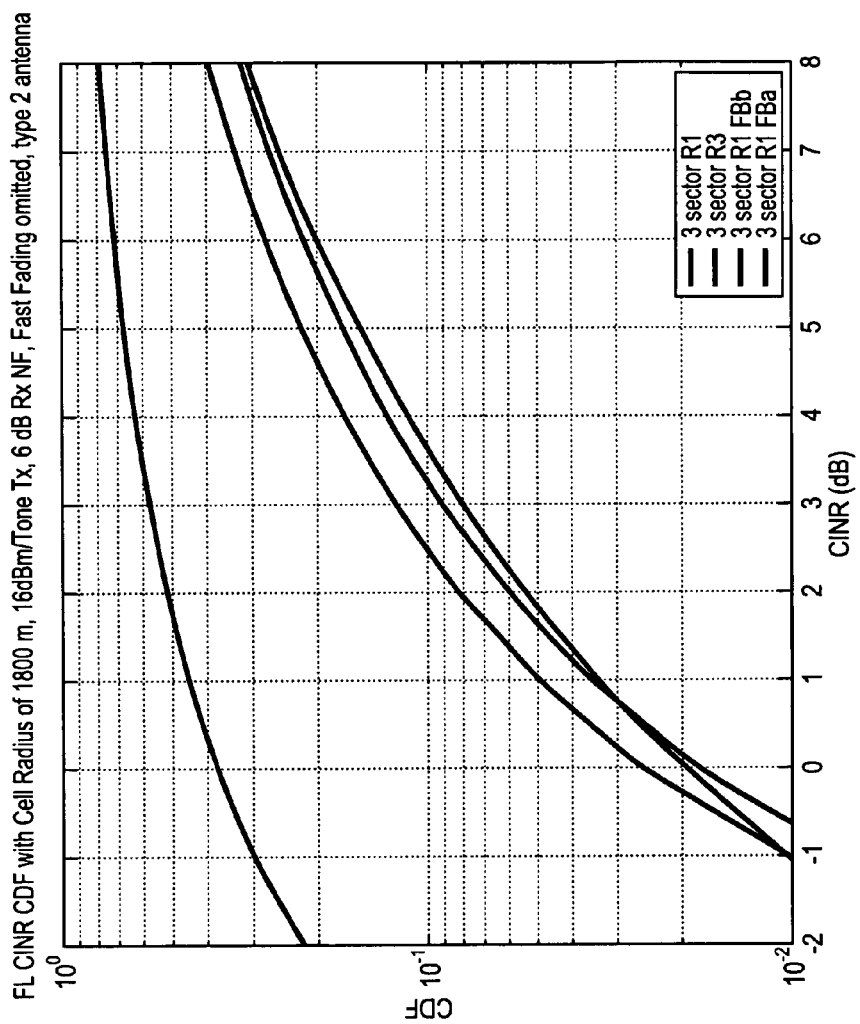
FIGS. 2 and 3 are graphs comparing theoretical results of an example embodiment, another scenario and other well-known techniques.
Figure 3:
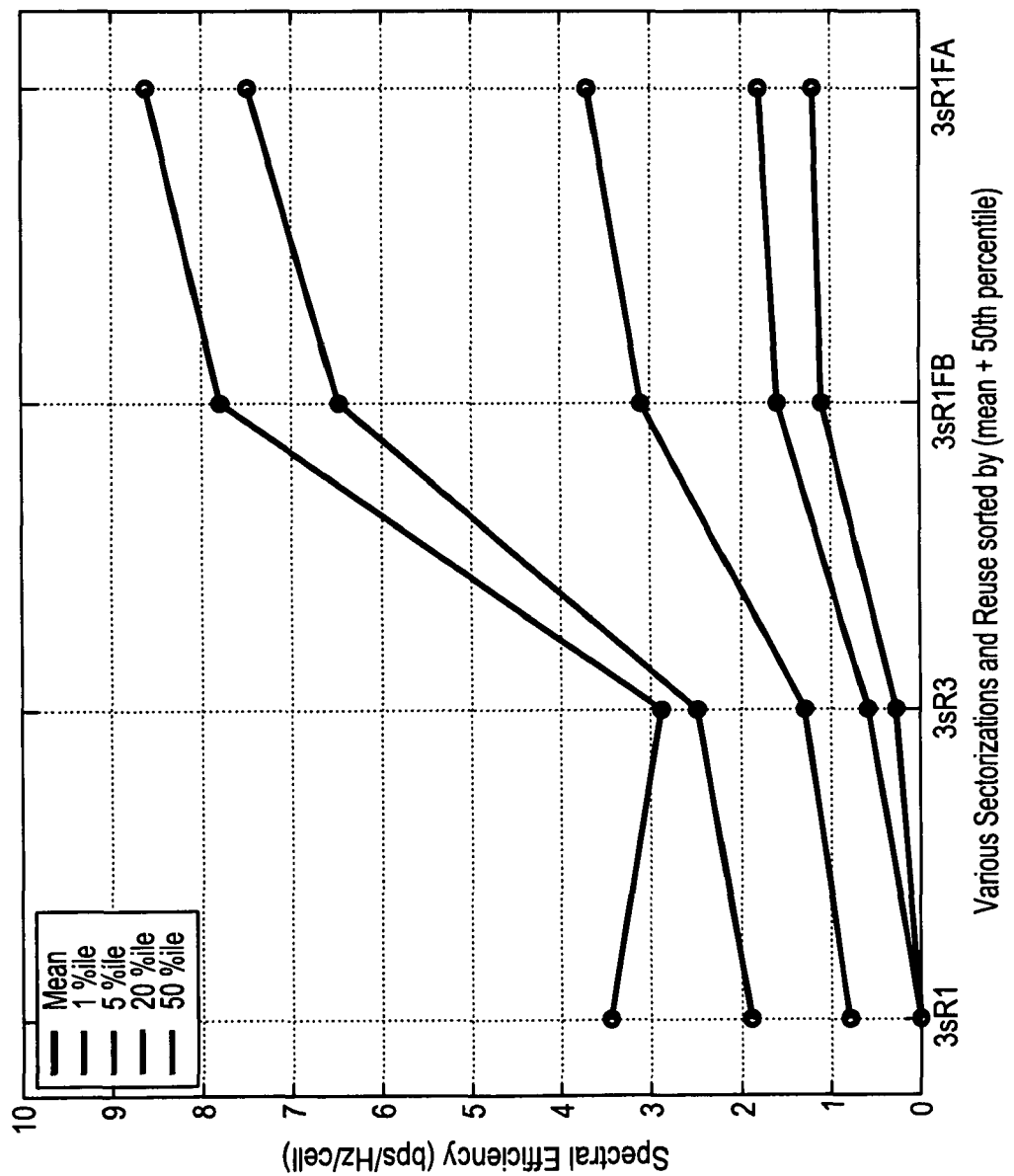

FIGS. 2 and 3 are graphs comparing the example embodiment described above with respect to FIG. 1 with other techniques implemented by a network or base station for communicating with mobile stations within a cell or sub-sector of a cell. In FIGS. 2 and 3, theoretical information associated with the example embodiment described with respect to FIG. 1 is identified as '3 sector R1 FBa'. This theoretical information is shown along with theoretical information associated with the well-known Reuse 1 frequency pattern identified as '3 sector R1' and the well-known Reuse 3 frequency pattern identified as '3 sector R3' mentioned in the background of this specification. FIGS. 2 and 3 also include theoretical information identified as '3 sector R1 FBb', which relates to the scenario described in the following paragraph.

If the sub-sectors of cell having nine sub-sectors assigned in a clockwise direction has the frequency assignments of 1, 2, 3, 1, 2, 3, 1, 2, 3 and the sub-sectors of an adjacent cell have the same frequency assignments of 1, 2, 3, 1, 2, 3, 1, 2, 3; there would be directly adjacent sub-sectors using the same assigned frequency. As such, not all of the boundaries of frequencies would be mismatched. This scenario is referred to in FIGS. 2 and 3 as '3 sector R1 FBb.'

FIG. 2 is a graph showing theoretical results of '3 sector R1', '3 sector R3', '3 sector R1 FBb', and '3 sector R1 FBa'. The horizontal axis of FIG. 2 reflects CINR in units of decibels (dB) and the vertical axis reflects a cumulative distribution function (CDF). In the 20th percentile region of the CDF there is more than 1 dB improvement in the CINR distribution with a frequency mapping according to the example embodiment described with respect to FIG. 1 (i.e., 3 sector R1 FBa) as compared with the '3 sector R1 FBb.' Also, it is noted that CINR according to the example embodiment described with respect to FIG. 1 is almost identical with the '3 sector R3' distribution, which was mentioned in the background and is the WiMAX default approach that guarantees a practical coverage performance without the use of segmented Partial Usage of Sub-Channels (PUSC) except for the mandated Frame Control Header (FCH) and MAP, etc. MAP as used in the previous paragraph includes the downlink MAP DL-MAP and the uplink MAP UL-MAP, which are management and control messages that are broadcast or unicast to mobile stations. One aspect of the MAP messages is to provide the DL frame location (e.g., a map of users' data within a frame) of users of data within each frame. One skilled in the art will also appreciate the FCH provides the modulation parameters of the MAP message.

Given CINR distributions such as those shown in FIG. 2, an estimate of spectral efficiency per cell estimate is obtained using the following conversion:

$$\eta = (\gamma > \gamma_l) Sr \log_2\left(1 + \frac{\min(\gamma, \gamma_u)}{3}\right).$$

In the above conversion, S is the number of sectors, r is the frequency reuse (⅓ or 1), γ is the CINR (linear units), $\gamma_u=10^{2.4}$ and $\gamma_l=10^{-0.38}$. Further, the downlink throughput from this per cell spectral efficiency could be estimated as T=Bδ, where B is the carrier bandwidth, and δ is the fraction of the frame interval devoted to downlink traffic. From the distributions of spectral efficiency, the mean and various percentiles are plotted in the graph of FIG. 3.

The theoretical results shown in FIG. 3, indicates that the example embodiment described with respect to FIG. 1 provides 10% more capacity and slightly better coverage.

Example embodiments being thus described, it will be obvious that the same may be varied in many ways. Such variations are not to be regarded as a departure from the example embodiments, and all such modifications are intended to be included within the scope.

I claim:

1. A frequency reuse method for wireless communications, the method comprising:
assigning a plurality of frequencies for use and reuse to a plurality of sectors of a cell of a wireless communication system, each of the plurality of sectors includes a plurality of sub-sectors, each of the plurality of sub-sectors having an assigned frequency for communicating with a mobile station within the sub-sector, the frequency assignments for each sector of the cell are different, and the assigned frequency of a first sub-sector of a first sector of a first cell being reused concurrently in a second sub-sector of a second sector of the first cell; and
communicating with the mobile station using the assigned frequency.

2. The method of claim 1, wherein a first frequency assigned to the first sub-sector within the first sector of the cell is different from a second frequency assigned to a first sub-sector of the second sector of the cell, a location of the first sub-sector within the first sector corresponds to a location of the first sub-sector within the second sector.

3. The method of claim 1, wherein each sector includes three sub-sectors.

4. The method of claim 3, wherein the cell includes three sectors.

5. The method of claim 4, wherein first through third sub-sectors of the first through third sectors of the cell are assigned first through third frequencies as follows: (A, a, 1); (A,b,2); (A,c,3); (B,a,2); (B,b,3); (B,c,1); (C,a,3); (C,b,1); (C,c,2), wherein
A represents the first sector,
B represents the second sector,
C represents the third sector,
a represents the first sub-sector,
b represents the second sub-sector,
c represents the third sub-sector,
1 represents the first frequency,
2 represents the second frequency, and
3 represents the third frequency.

6. A frequency reuse method for a wireless communication system including a plurality of cells, the method comprising:
assigning a plurality of frequencies to each cell of a wireless communication system, each cell including a plurality of sectors and each of the plurality of sectors including a plurality of sub-sectors, each of the plurality of sub-sectors having an assigned frequency for communicating with a mobile station within the sub-sector, the assigned frequency of a first sub-sector of a first cell is different from the assigned frequency of an adjacent sub-sector of another cell adjacent to the first cell, and the assigned frequency of a first sub-sector of a first sector of the first cell being reused concurrently in a second sub-sector of a second sector of the first cell; and
communicating with the mobile station using the assigned frequency.

7. The method of claim 6, wherein the assigned frequency of the first sub-sector is different from the assigned frequency of all sub-sectors adjacent to the first sub-sector.

8. The method of claim 6, wherein the plurality of frequencies assigned to each cell are the same.

9. The method of claim 6, the frequency assignments for each sector of a same cell are different.

10. The method of claim 9, wherein a first frequency assigned to the first sub-sector within the first sector of the first cell is different from a second frequency assigned to a first sub-sector of the second sector of the first cell, a location of the first sub-sector within the first sector corresponds to a location of the first sub-sector within the second sector.

11. The method of claim 6, wherein each sector includes three sub-sectors.

12. The method of claim 11, wherein each cell includes three sectors.

13. The method of claim 12, wherein first through third sub-sectors of the first through third sectors of each cell are assigned first through third frequencies as follows: (A, a, 1); (A,b,2); (A,c,3); (B,a,2); (B,b,3); (B,c,1); (C,a,3); (C,b,1); (C,c,2), wherein A represents the first sector,
    B represents the second sector,
    C represents the third sector,
    a represents the first sub-sector,
    b represents the second sub-sector,
    c represents the third sub-sector,
    1 represents the first frequency,
    2 represents the second frequency, and
    3 represents the third frequency.

14. A frequency reuse method for wireless communications, the method comprising:
    assigning a plurality of frequencies for use and reuse to a plurality of sectors of a plurality of cells of a wireless communication system, each of the plurality of sectors of each cell being assigned a frequency for communicating with a mobile station within a corresponding sector, the frequency assignments for each cell are the same and no sector is assigned a same frequency as a directly adjacent sector, and the assigned frequency of a first sub-sector of a first sector of each cell being reused concurrently in a second sub-sector of a second sector of each cell; and
    communicating with the mobile station using the assigned frequency.

15. The method of claim 14, wherein each cell includes nine sectors.

16. The method of claim 15, wherein first through ninth sectors arranged in a clockwise direction around a base station of each cell are assigned first through third frequencies in accordance with the pattern 1, 2, 3, 2, 3, 1, 3, 1, 2, wherein
    1 represents a first frequency,
    2 represents a second frequency, and
    3 represents a third frequency, the first frequency, second frequency and third frequencies all being different.

* * * * *